(12) United States Patent
Muresane et al.

(10) Patent No.: US 7,015,895 B2
(45) Date of Patent: Mar. 21, 2006

(54) COMPUTER MOUSE

(75) Inventors: David Darian Muresane, Seattle, WA (US); David Muresane, Seattle, WA (US)

(73) Assignee: David D. Muresan

( * ) Notice: Subject to any disclaimer, the term of this patent is extended or adjusted under 35 U.S.C. 154(b) by 694 days.

(21) Appl. No.: 08/653,425

(22) Filed: May 24, 1996

(65) Prior Publication Data

US 2004/0070550 A1    Apr. 15, 2004

(51) Int. Cl.
G09G 5/08    (2006.01)

(52) U.S. Cl. .................................................. 345/163

(58) Field of Classification Search ................ 345/163, 345/164, 167, 179
See application file for complete search history.

(56) References Cited

U.S. PATENT DOCUMENTS 5,371,516 A * 12/1994 Toyoda et al. ............... 345/163
5,583,541 A * 12/1996 Solhjell ....................... 345/163
5,696,537 A * 12/1997 Solhjell

* cited by examiner

*Primary Examiner*—Regina Liang

(57) ABSTRACT

This invention refers to a computer mouse used to control the pointer on a monitor screen. The standard computer mouse uses one ball and three rollers to obtain the two dimensional position of the mouse. The first two rollers are used to update the position of the mouse, when the ball is moving, by having a third roller push the ball against the first two rollers. The force of the third roller keeps the ball in constant contact with the first two rollers guaranteeing that any movement of the ball is transmitted to the first two rollers which then update the position of the mouse on the screen. This invention replaces the functionality of the third roller by a magnet, which in turn increases the precision of the computer mouse.

1 Claim, 1 Drawing Sheet

COMPUTER MOUSE

BACKGROUND OF THE INVENTION

One of the existing computer mice uses one rubber ball (S) with a metal core and three rollers to obtain the two dimensional position of the mouse. The first two rollers (X and Y) are perpendicular to each other and in constant contact with the rubber ball (S). The movement of the rubber ball (S) is transmitted to the first two rollers which update the x and y positions of the mouse. To guarantee that the mouse is in constant contact with the first two rollers, a third roller (H) is used to push the ball against the first two rollers. The contact of the third roller (H) has the following disadvantages:

1. Increased friction on the rubber ball.
2. The rubber ball is prevented from moving as freely and may even get stuck.
3. Erratic movement of the ball when dirt accumulates on the third roller (H).
4. The third roller (H) is an extra part that needs cleaning and periodic maintenance.

This patent suggests using a magnet (M) to replace the third roller (H) and thus eliminate the problems associated with it. Two other patents, U.S. Pat. No. 5,371,516 and U.S. Pat. No. 5,583,541 use a magnet in conjunction with a rubber ball for a computer mouse device. However, the two patents do not eliminate the contact with the third roller (H). In U.S. Pat. No. 5,371,516 Toyoda suggests using a magnet to hold the ball in a pen like writing device, while the ball continues to have contact with three different rollers. In U.S. Pat. No. 5,583,541 the authors suggest using a magnet to control the rolling force of the ball. This does not eliminate the functionality of the third ball, which also controls the force of the ball against the first two rollers.

BRIEF SUMMARY OF THE INVENTION

This patent suggests using a magnet (M) to replace the third roller (H), in a standard mouse design, and thus eliminate the problems associated with having a third roller (H). The magnet (M) is to be placed diagonally across from the location of the third roller (H). Since the rubber ball (S) has a magnetic core, the magnet (M) will exert a pulling force ($F_2$) on the ball (S) which is equivalent with the pushing force ($F_1$) of the third roller (S) on the ball.

DETAILED DESCRIPTION OF THE INVENTION

Figure 1:
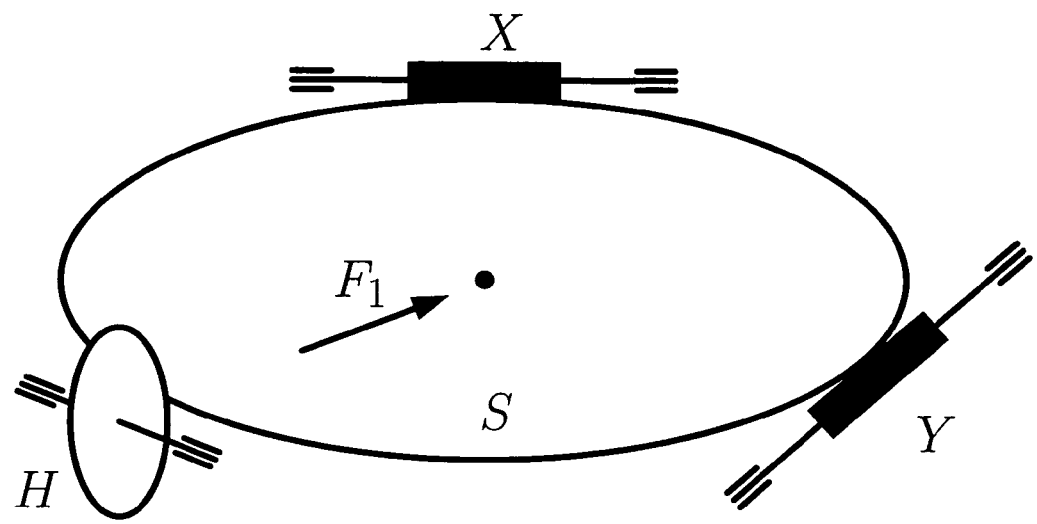
FIG. 1 shows the mechanical schematic of an existing mouse.
Figure 2:
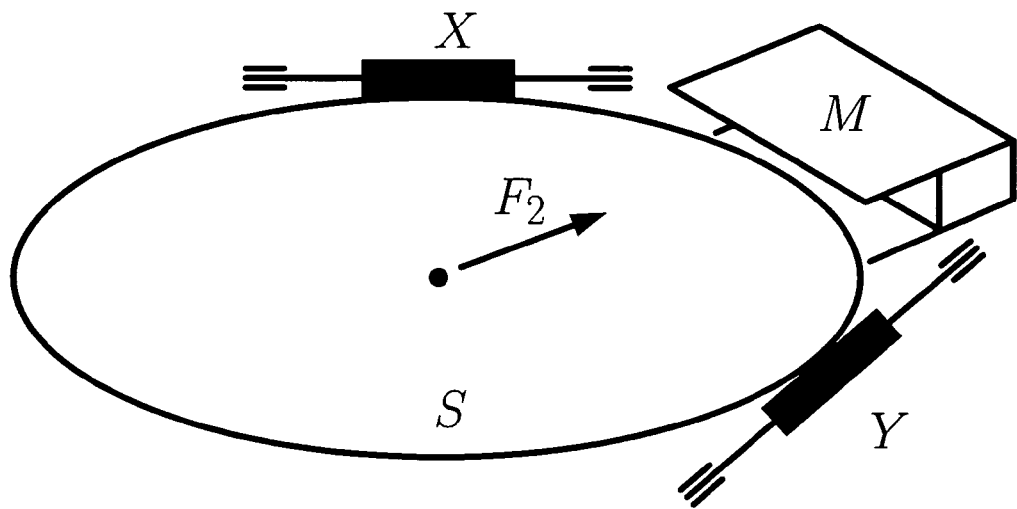
FIG. 2. shows the mechanical schematic of the mouse in the new invention.

In FIG. 2 the magnet (M) is to be placed diagonally across from the location of the third roller (H). Since the rubber ball (S) has a magnetic core, the magnet (M) will exert a pulling force ($F_2$) on the ball which is equivalent with the pushing force ($F_1$) of the third roller (H) on the ball (S). The use of magnet M eliminates the need for roller H. The advantage of this new design is that there is no contact between the magnet (M) and the magnetic core ball (S). This will reduce the total friction on the ball (S), increase the precision of the mouse, and reduce the necessity for cleaning.

We claim:

1. A computer mouse characterized by using a magnet, to pull the rubber magnetic core ball against the coordinates X and Y shafts only; and there is no third, or any other contact between the ball and any other part of the mouse, especially no third contact between the ball and another wheel (FIG. 2).

* * * * *